US009541970B2

United States Patent
Wu

(10) Patent No.: US 9,541,970 B2
(45) Date of Patent: Jan. 10, 2017

(54) HEAT DISSIPATION STRUCTURE OF WEARABLE WATCHSTRAP

(71) Applicant: ASIA VITAL COMPONENTS CO., LTD., New Taipei (TW)

(72) Inventor: Chun-Ming Wu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 45 days.

(21) Appl. No.: 14/571,301

(22) Filed: Dec. 16, 2014

(65) Prior Publication Data

US 2016/0132081 A1 May 12, 2016

(30) Foreign Application Priority Data

Nov. 10, 2014 (TW) .............................. 103138958 A

(51) Int. Cl.
*H05K 7/20* (2006.01)
*G06F 1/20* (2006.01)
*G06F 1/16* (2006.01)

(52) U.S. Cl.
CPC .............. *G06F 1/203* (2013.01); *G06F 1/163* (2013.01)

(58) Field of Classification Search
CPC ....... H07K 7/20; H07K 7/20263; G06F 1/203; G06F 1/163
USPC ................................ 361/679.46, 688, 679.03
See application file for complete search history.

(56) References Cited

U.S. PATENT DOCUMENTS

| | | | | |
|---|---|---|---|---|
| 5,770,835 A | * | 6/1998 | Sakuyama | ........... B23K 1/0053 219/388 |
| 6,304,520 B1 | * | 10/2001 | Watanabe | .......... G04B 37/0008 368/203 |
| 6,757,390 B2 | * | 6/2004 | Ito | .......................... H04B 1/385 379/433.02 |
| 8,725,842 B1 | * | 5/2014 | Al-Nasser | .............. G04G 17/08 367/11 |
| 2012/0180995 A1 | * | 7/2012 | Yang | ..................... F28D 15/046 165/104.26 |

OTHER PUBLICATIONS

IBM, Compact thermal solution for wearable computer, Research Disclosure, Questel Ireland, Apr. 2000.*
STIC search report.*

* cited by examiner

*Primary Examiner* — Dion R Ferguson
*Assistant Examiner* — Mandeep S Buttar
(74) *Attorney, Agent, or Firm* — C. G. Mersereau; Nikolai & Mersereau, P.A.

(57) ABSTRACT

A heat dissipation structure of wearable watchstrap includes a wearable strap body. The wearable strap body includes a heat conduction section and a protection section. The protection section encloses the heat conduction section. The heat conduction section has a heat absorption section and a heat dissipation section. The heat dissipation section outward extends from the heat absorption section. The wearable strap body is connectable with an intelligent mobile device to greatly enhance the heat dissipation performance of the intelligent mobile device.

13 Claims, 32 Drawing Sheets

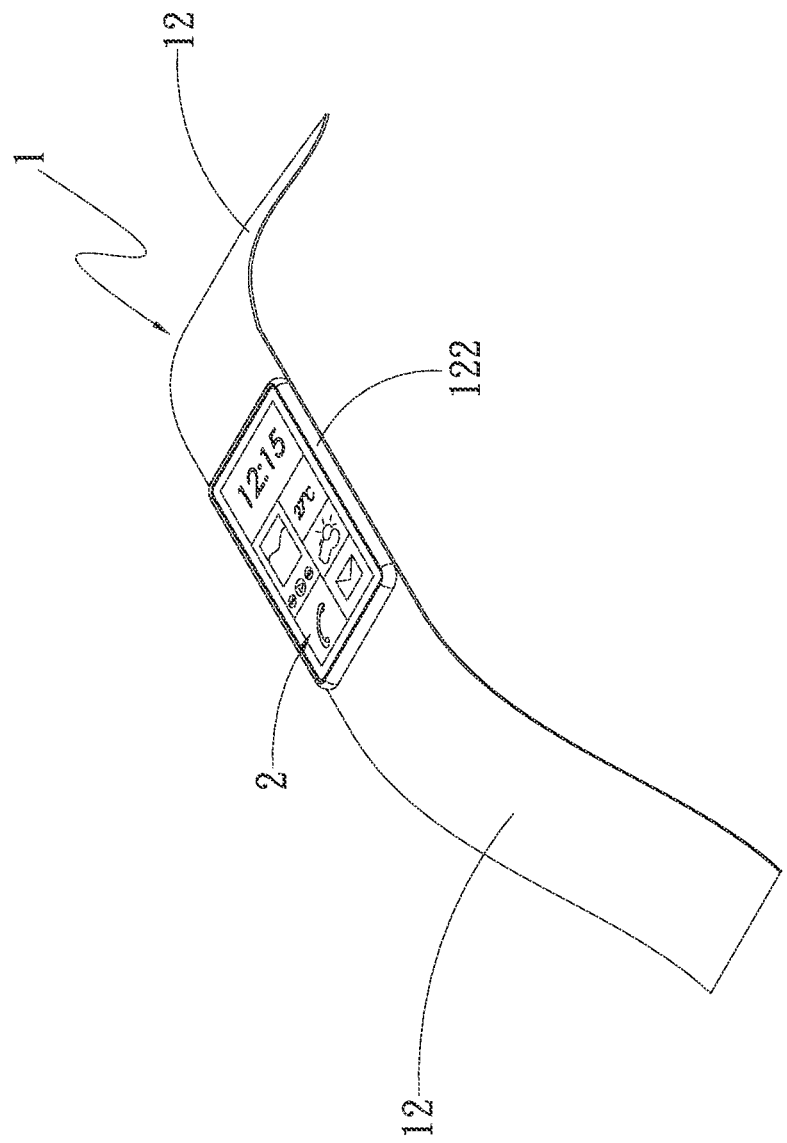

HEAT DISSIPATION STRUCTURE OF WEARABLE WATCHSTRAP

This application claims the priority benefit of Taiwan patent application number 103138958 filed on Nov. 10, 2014.

BACKGROUND OF THE INVENTION

1. Field of the Invention

The present invention relates generally to a heat dissipation structure of wearable watchstrap, and more particularly to a heat dissipation structure of wearable watchstrap, which can dissipate the heat generated by a wearable intelligent mobile device connected with the heat dissipation structure.

2. Description of the Related Art

Various multifunction intelligent mobile devices have been developed, including mobile phones, tablets and even intelligent wearable electronic devices such as watches, necklaces and fingerings. Along with the continuous increase of the functions, the intelligent wearable electronic device is equipped with more and more components such as touch screen and satellite positioning chip. The intelligent watch is connectable to other mobile devices via Bluetooth or network. Moreover, a SIN card can be inserted into the intelligent watch to access to 3G or 4G network and make phone calls. In operation or execution, the intelligent watch will generate heat. In addition, the entire intelligent watch is designed with a fully sealed structure for achieving waterproof effect. Under such circumstance, the heat generated by the electronic components in the intelligent watch can be hardly dissipated outward. As a result, the heat will accumulate in the interior of the watch. This will lead to deterioration of execution efficiency of the intelligent watch or even shutdown of the intelligent watch. Accordingly, it has become a critical issue how to solve the heat dissipation problem of the intelligent watch and various wearable mobile devices.

SUMMARY OF THE INVENTION

It is therefore a primary object of the present invention to provide a heat dissipation structure of wearable watchstrap, which can effectively solve the heat accumulation problem of the intelligent mobile device.

To achieve the above and other objects, the heat dissipation structure of wearable watchstrap of the present invention includes a wearable strap body. The wearable strap body includes a heat conduction section and a protection section. The protection section encloses the heat conduction section. The heat conduction section has a heat absorption section and a heat dissipation section. The heat dissipation section outward extends from the heat absorption section. The wearable strap body is connectable with an intelligent mobile device to greatly enhance the heat dissipation performance of the intelligent mobile device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 8B is a perspective assembled view of the third embodiment of the present invention in the other aspect;

DETAILED DESCRIPTION OF THE PREFERRED EMBODIMENTS

Figure 1:
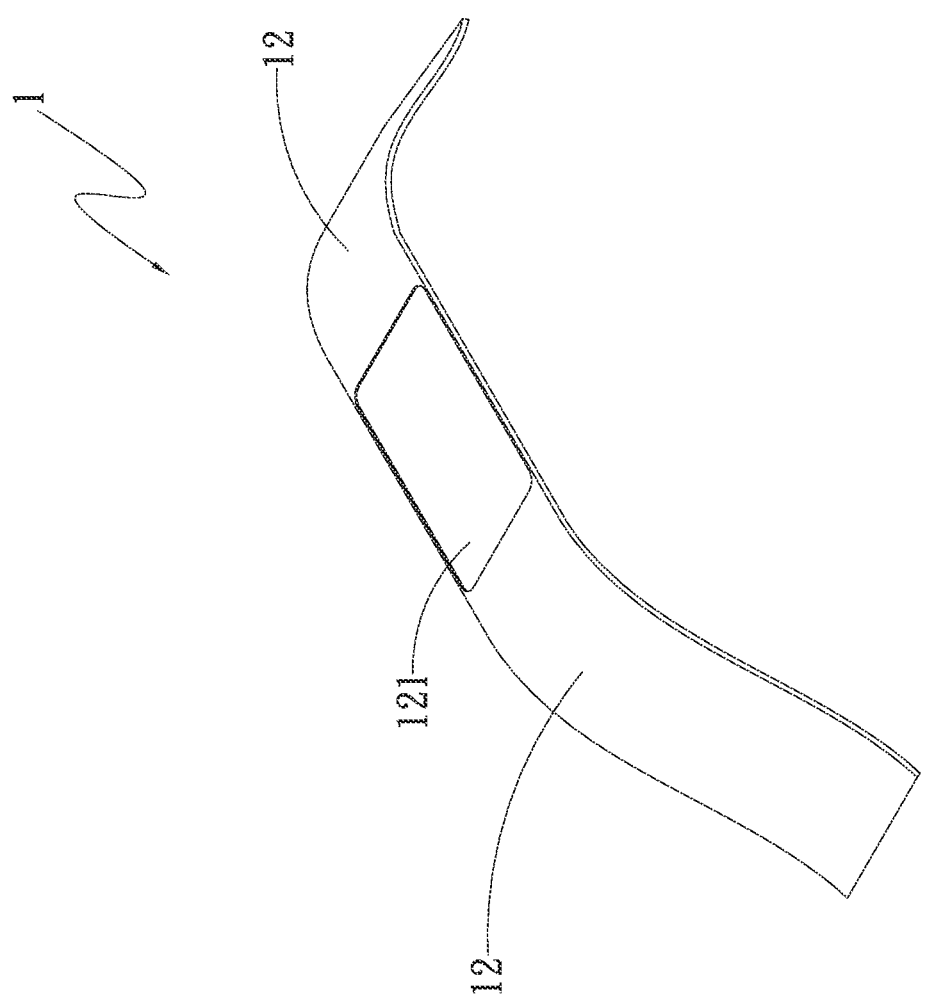
FIG. 1 is a perspective view of a first embodiment of the present invention.
Figure 2:
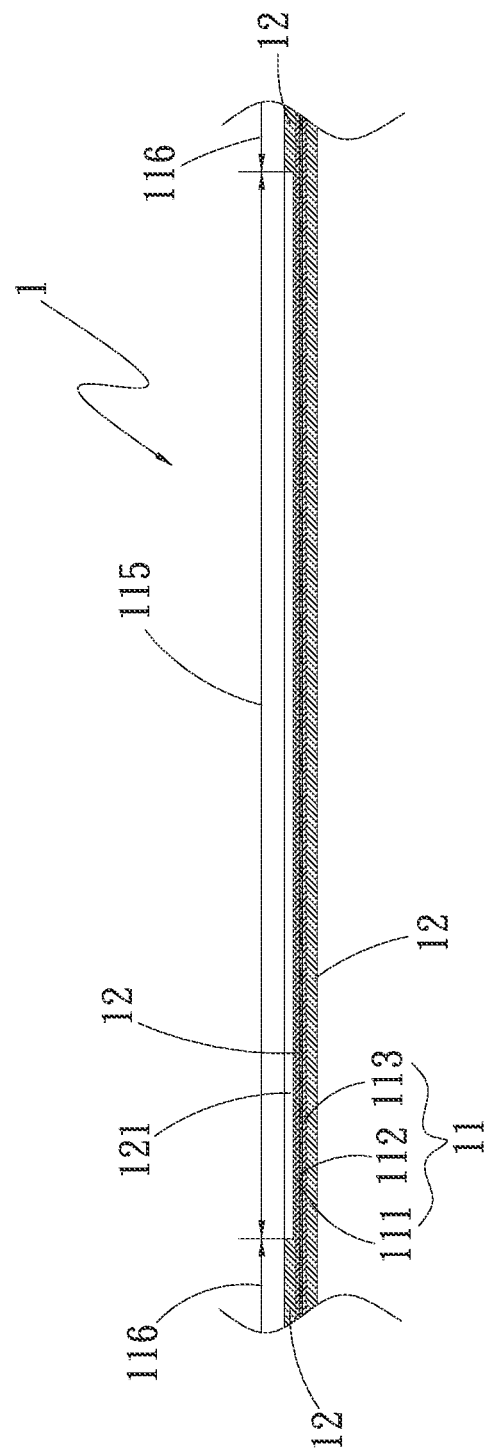
FIG. 2 is a sectional view of the first embodiment of the present invention.

Please refer to FIGS. 1 and 2. FIG. 1 is a perspective view of a first embodiment of the present invention. FIG. 2 is a sectional view of the first embodiment of the present invention. According to the first embodiment, the heat dissipation structure of wearable watchstrap includes a wearable strap body 1. In this embodiment, the wearable strap body 1 is a flexible wearable strap body 1 (soft and bendable watchstrap) for illustration. The wearable strap body 1 includes a heat conduction section 11 and a protection section 12. The protection section 12 is made of flexible plastic material and encloses the heat conduction section 11. The protection section 12 is formed with a recess 121. The recess 121 is formed at the center of one face of the protection section 12. The heat conduction section 11 is made of graphite, metal foil or a combination thereof. The heat conduction section 11 has a heat absorption section 115 and a heat dissipation section 116. One face of the heat absorption section 115 corresponds to the recess 121. That is, the recess 121 is positioned on upper side of one face of the heat absorption section 115 and separated from the heat absorption section 115 by the protection section 12. The heat dissipation section 116 outward extends from the heat absorption section 115. In this embodiment, the heat dissipation section 116 outward extends from, but not limited to, at least one side of the heat absorption section 115 for illustration. That is, the heat dissipation section 116 is positioned in the protection section 12 of the front section and rear section of the wearable strap body 1. The heat absorption section 115 is positioned in the protection section 12 of the middle section of the wearable strap body 1. The heat absorption section 115 serves to absorb heat and the heat dissipation section 116 serves to dissipate the heat outward.

In this embodiment, the heat conduction section 11 has, but not limited to, three heat conduction layers for illustration purposes only. In practice, according to the requirements of heat conduction efficiency, total thickness and the appearance, the heat conduction section 11 can be alternatively designed with one heat conduction layer (graphite or metal foil), two heat conduction layers, four heat conduction layers or more heat conduction layers. The heat conduction section 11 has a first heat conduction layer 111, a second heat conduction layer 112 and a third heat conduction layer 113. The first heat conduction layer 111 corresponds to the recess 121. The second heat conduction layer 112 is sandwiched between the first and third heat conduction layers 111, 113. The first and third heat conduction layers are made of metal foils, and preferably copper foils. The second heat conduction layer 112 is made of graphite material. However, the material of the heat conduction layers is not limited to the above material. In practice, the first, second and third heat conduction layers 111, 112, 113 can be made of graphite, metal foils (gold foils, silver foils, copper foils or aluminum foils) or the combination of graphite and metal foils. For example, the first and second heat conduction layers 111, 112 are made of graphite, while the third heat conduction layer 113 is made of copper foil or the first heat conduction layer 111 is made of copper foil, while the second and third heat conduction layers 112, 113 are made of graphite, and so on.

The heat dissipation structure of wearable watchstrap of the present invention is mainly applied to and connected with an intelligent mobile device. The heat dissipation structure of wearable watchstrap of the present invention enables a user to wear the intelligent mobile device and provides heat dissipation effect for the intelligent mobile device. Therefore, the heat will not accumulate in the intelligent mobile device and the heat dissipation performance of the intelligent mobile device is enhanced.

Figure 3:
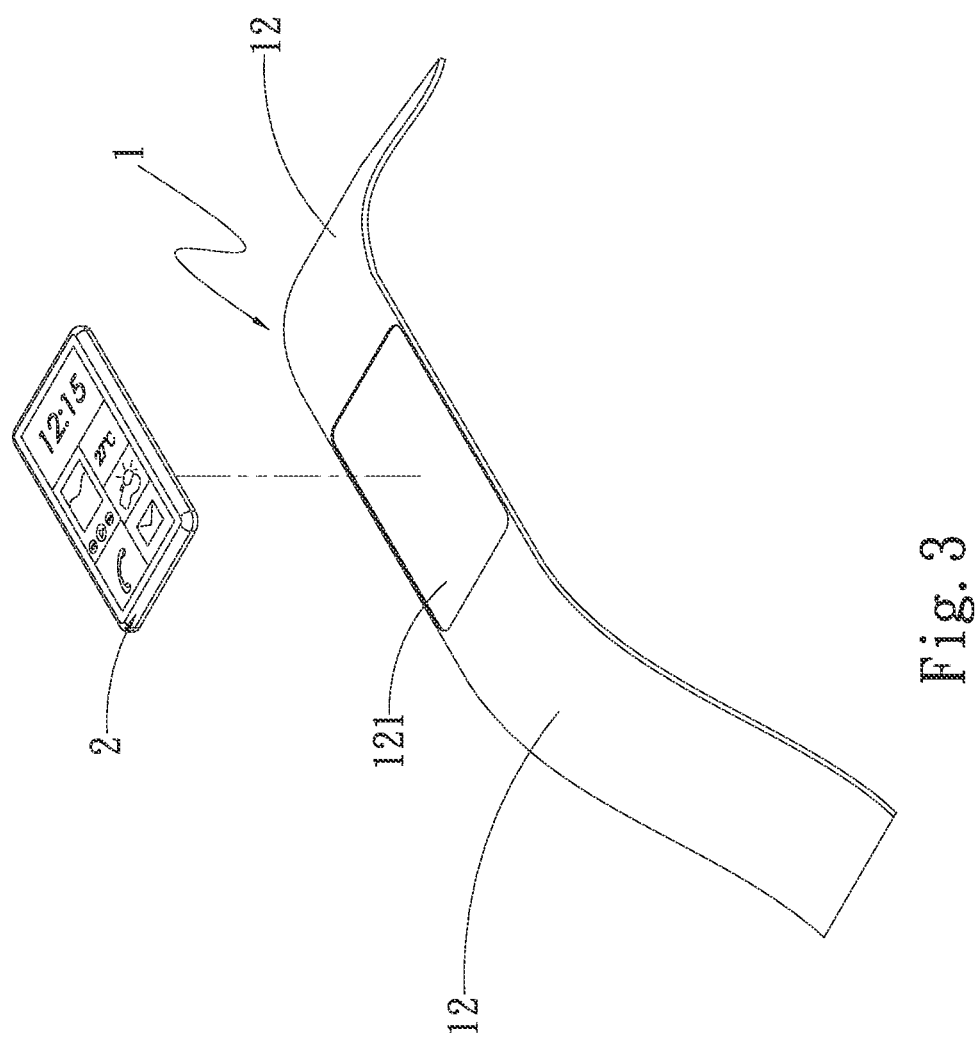
FIG. 3 is a perspective exploded view of a second embodiment of the present invention.
Figure 4:
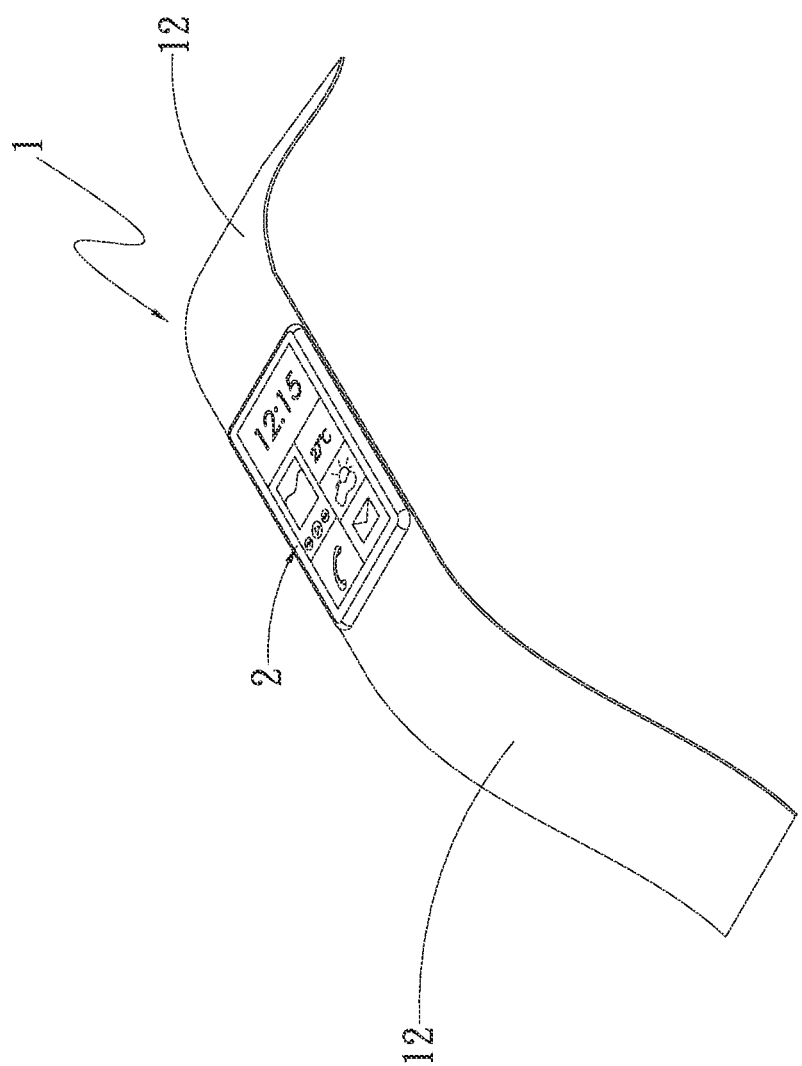
FIG. 4 is a perspective assembled view of the second embodiment of the present invention.
Figure 5:
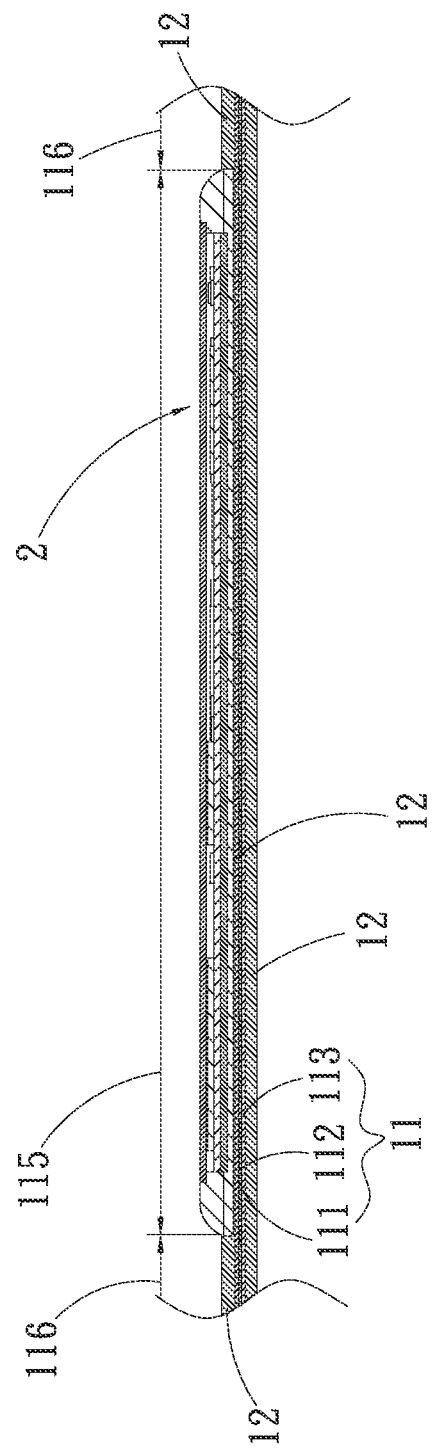
FIG. 5 is a sectional assembled view of the second embodiment of the present invention.

Please now refer to FIGS. 3, 4 and 5. FIG. 3 is a perspective exploded view of a second embodiment of the present invention. FIG. 4 is a perspective assembled view of the second embodiment of the present invention. FIG. 5 is a sectional assembled view of the second embodiment of the present invention. The second embodiment is substantially identical to the first embodiment in structure, connection relationship and effect and thus will not be repeatedly described. The second embodiment is mainly different from the first embodiment in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. The first heat conduction layer 111 of the heat conduction section 11 corresponds to the intelligent mobile device 2 received in the recess 121. When the intelligent mobile device 2 generates heat, the first heat conduction layer 111 absorbs the heat and quickly transfers the heat to the second and third heat conduction layers 112, 113. At the same time, the heat is conducted to the heat dissipation section 116 and dissipated outward. Accordingly, the heat accumulation problem of the intelligent mobile device 2 is solved. In other words, the heat generated by the intelligent mobile device 2 can be effectively dissipated.

Figure 6:
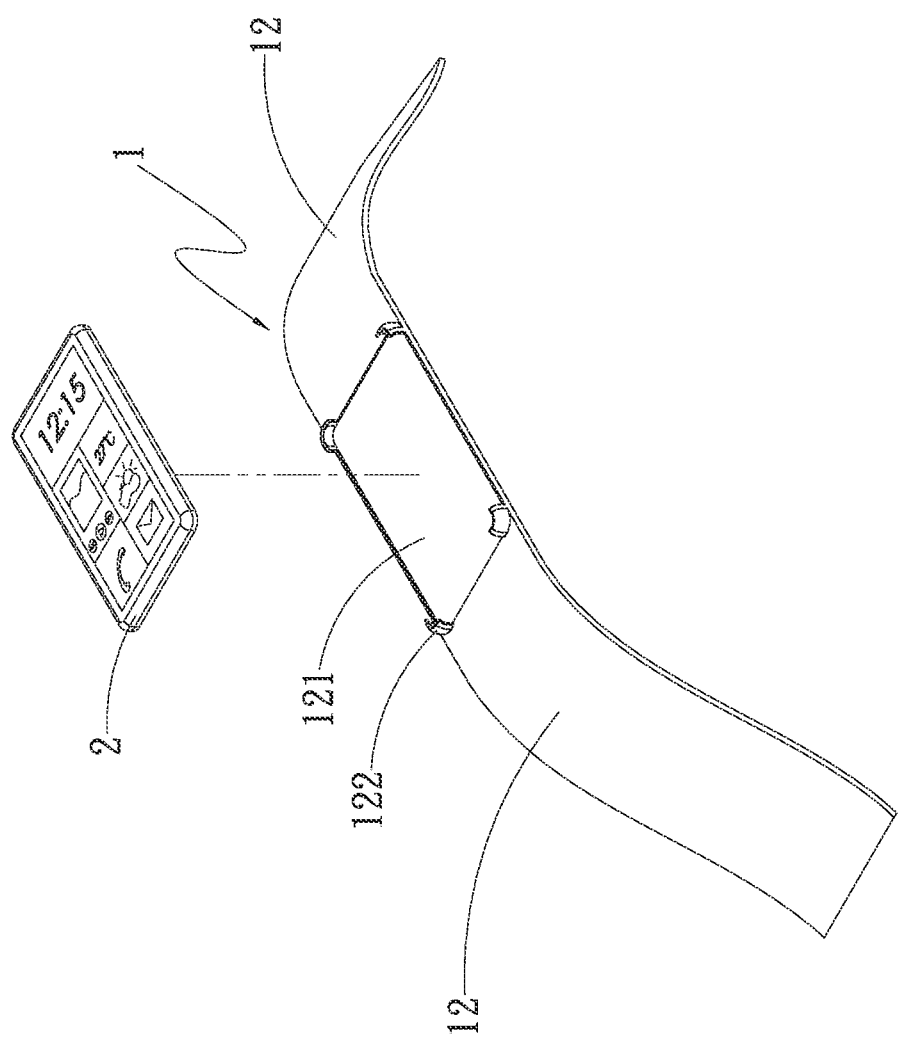
FIG. 6 is a perspective exploded view of a third embodiment of the present invention.
Figure 7:
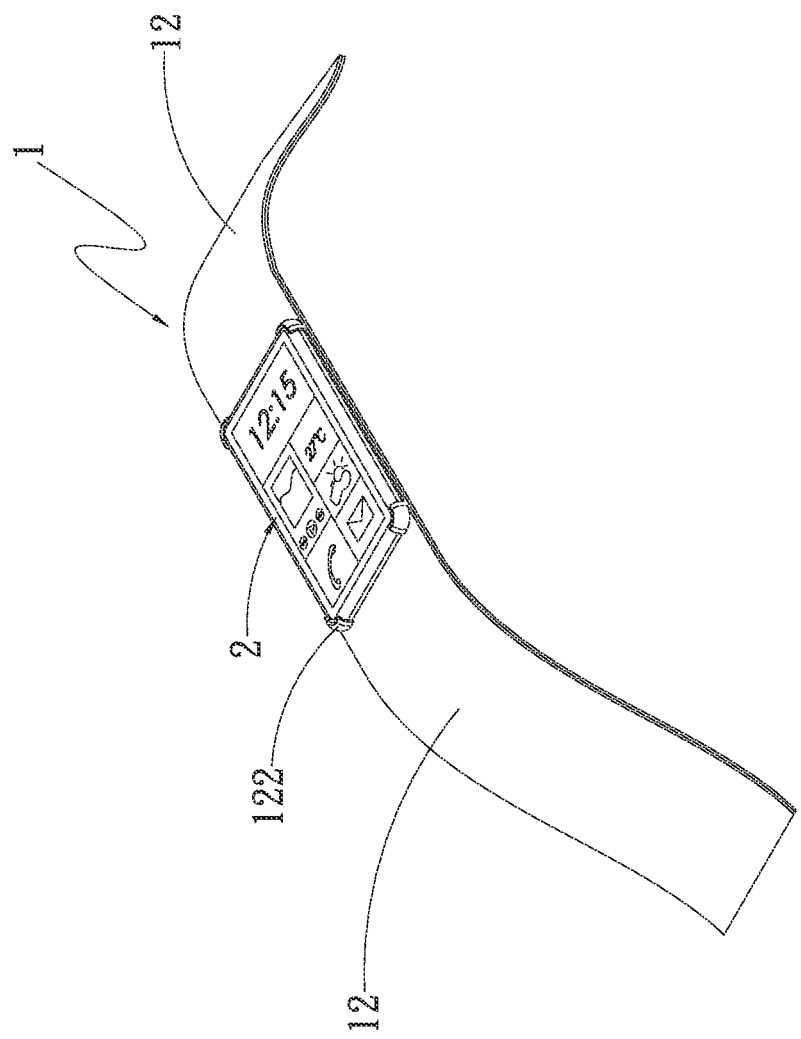
FIG. 7 is a perspective assembled view of the third embodiment of the present invention.
Figure 8:
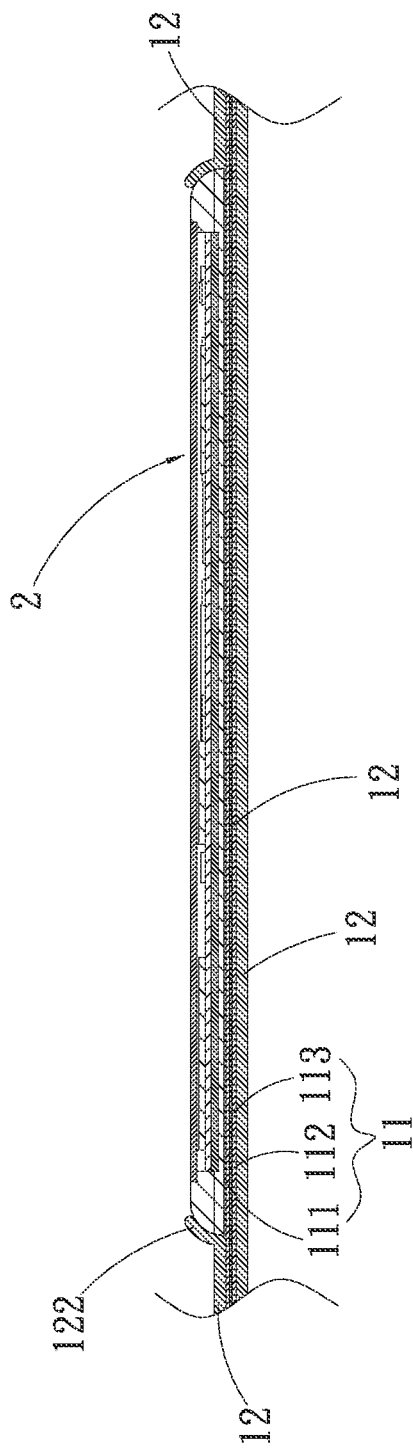
FIG. 8 is a sectional assembled view of the third embodiment of the present invention.

Please now refer to FIGS. 6, 7 and 8. FIG. 6 is a perspective exploded view of a third embodiment of the present invention. FIG. 7 is a perspective assembled view of the third embodiment of the present invention. FIG. 8 is a sectional assembled view of the third embodiment of the present invention. The third embodiment is substantially identical to the second embodiment in structure, connection relationship and effect and thus will not be repeatedly described. The third embodiment is different from the second embodiment in that the protection section 12 has multiple engagement protrusion bodies 122. The engagement protrusion bodies 122 upward protrude from one face of the protection section 12 in adjacency to the recess 121. The intelligent mobile device 2 is received in the recess 121 and the periphery of the intelligent mobile device 2 is correspondingly engaged with free ends of the engagement protrusion bodies 122.

Figure 8A:
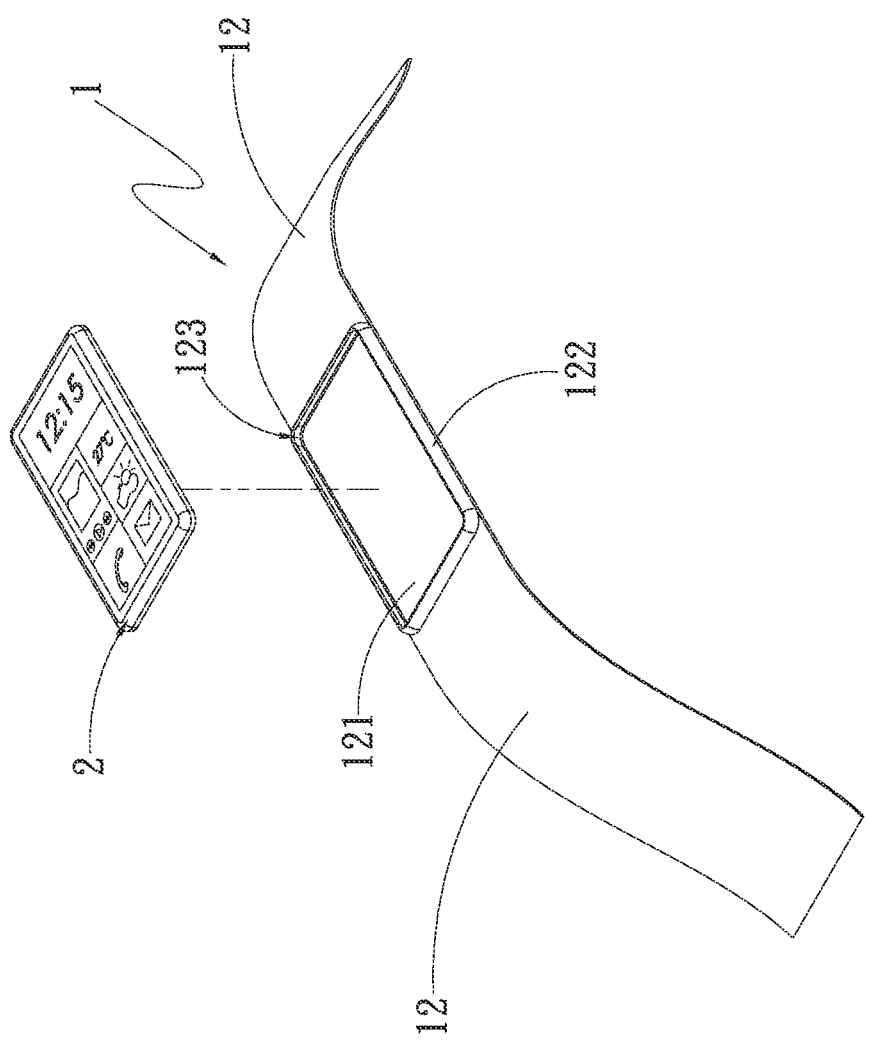
FIG. 8A is a perspective exploded view of the third embodiment of the present invention in another aspect.

In practice, the engagement protrusion bodies 122 are not limited to the above form. Alternatively, the engagement protrusion bodies 122 can have the form of a peripheral wall as shown in FIGS. 8A and 8B. The peripheral wall upward protrudes from one face of the protection section 12 in adjacency to the recess 121 to define a space 123. The intelligent mobile device 2 is received in the recess 121 and the periphery of the intelligent mobile device 2 is correspondingly enclosed in the space 123.

Figure 9:
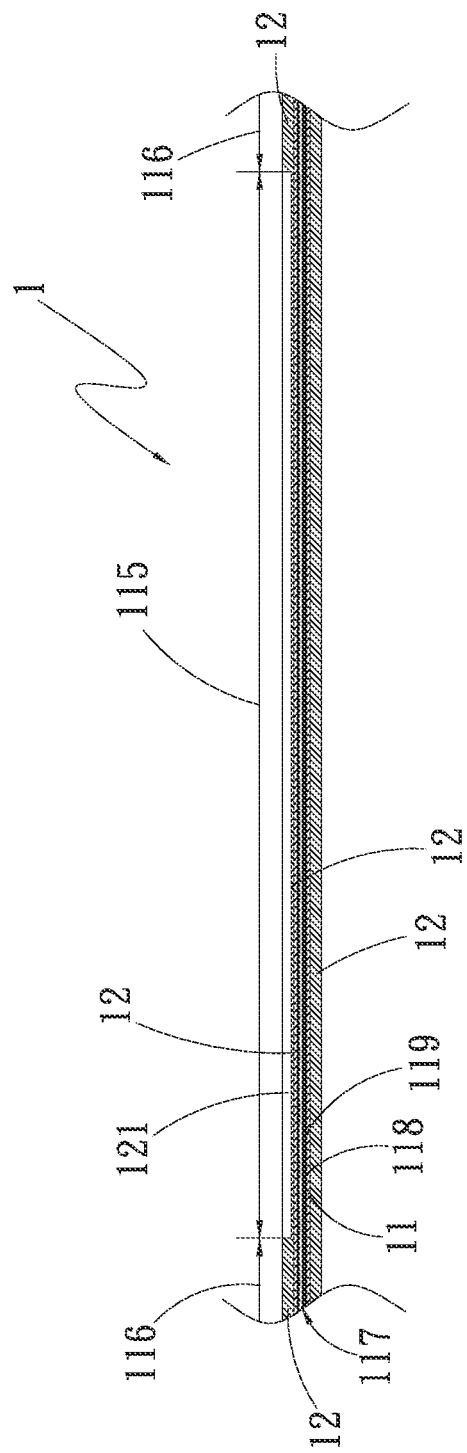
FIG. 9 is a sectional view of a fourth embodiment of the present invention.

Please now refer to FIG. 9, which is a sectional view of a fourth embodiment of the present invention. The fourth embodiment is substantially identical to the first embodiment in structure, connection relationship and effect and thus will not be repeatedly described. The fourth embodiment is different from the first embodiment in that the heat conduction section 11 is a flexible heat pipe. That is, the heat conduction section 11 is a flexible heat pipe made of flexible metal material (such as copper material), flexible thin heat pipe made of flexible metal material (such as copper material or aluminum material) or flexible thin heat pipe made of flexible nonmetal material (such as plastic, rubber or polyethylene terephthalate, PET). The protection section 12 is made of flexible plastic material or hard plastic material. In this embodiment, the protection section 12 is made of flexible plastic material for illustration.

In this embodiment, the heat conduction section 11 is a flexible heat pipe for illustration. The heat conduction section 11 has a chamber 117 and a capillary structure 118. A working fluid 119 is filled in the chamber 117. The working fluid 119 is selected from a group consisting of pure water, inorganic compound, alcohol group, ketone group, liquid metal, coolant and organic compound. The capillary structure 118 is formed on inner wall face of the chamber 117. One face of the heat absorption section 115 of the heat conduction section 11 (the flexible heat pipe) corresponds to the recess 121.

Figure 10:
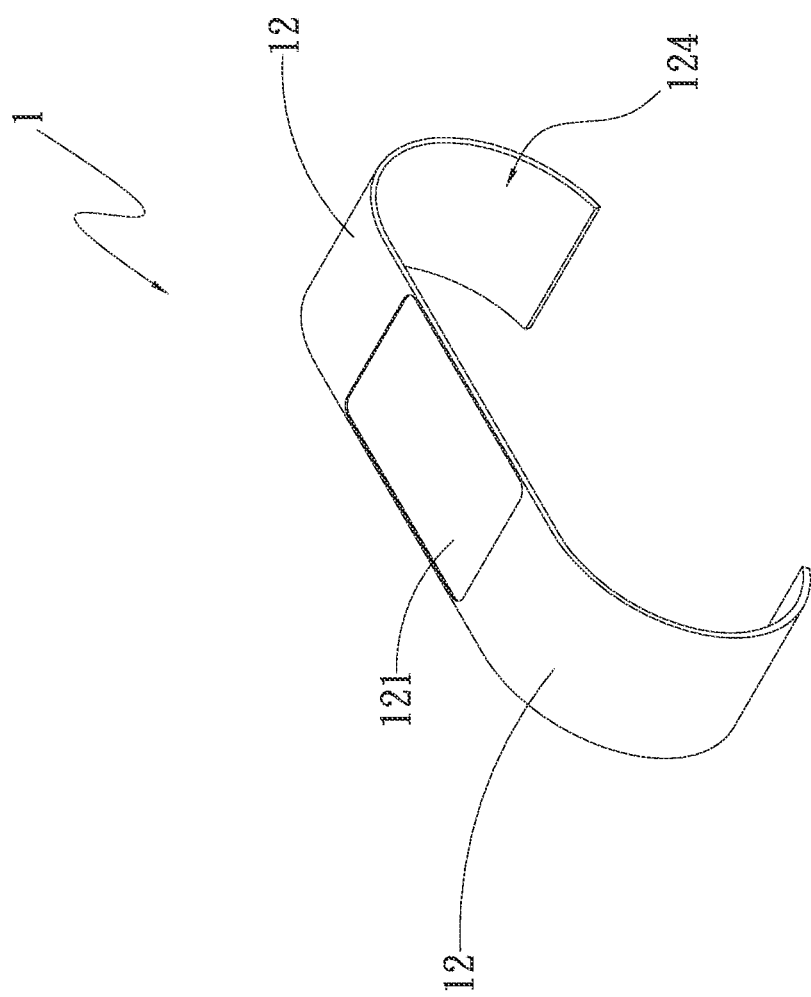
FIG. 10 is a perspective view of a fifth embodiment of the present invention.

Please now refer to FIG. 10, which is a perspective view of a fifth embodiment of the present invention. Also referring to FIG. 9, the fifth embodiment is substantially identical to the fourth embodiment in structure, connection relationship and effect and thus will not be repeatedly described. The fifth embodiment is different from the fourth embodiment in that the heat conduction section 11 is a heat pipe made of hard metal material and the protection section 12 is made of hard plastic material. Therefore, the heat dissipation sections 116 on two sides of the heat absorption section 115 are respectively inward bent and secured to form a fitting opening 124. A user can directly wear the wearable strap body 1 through the fitting opening 124.

Figure 11:
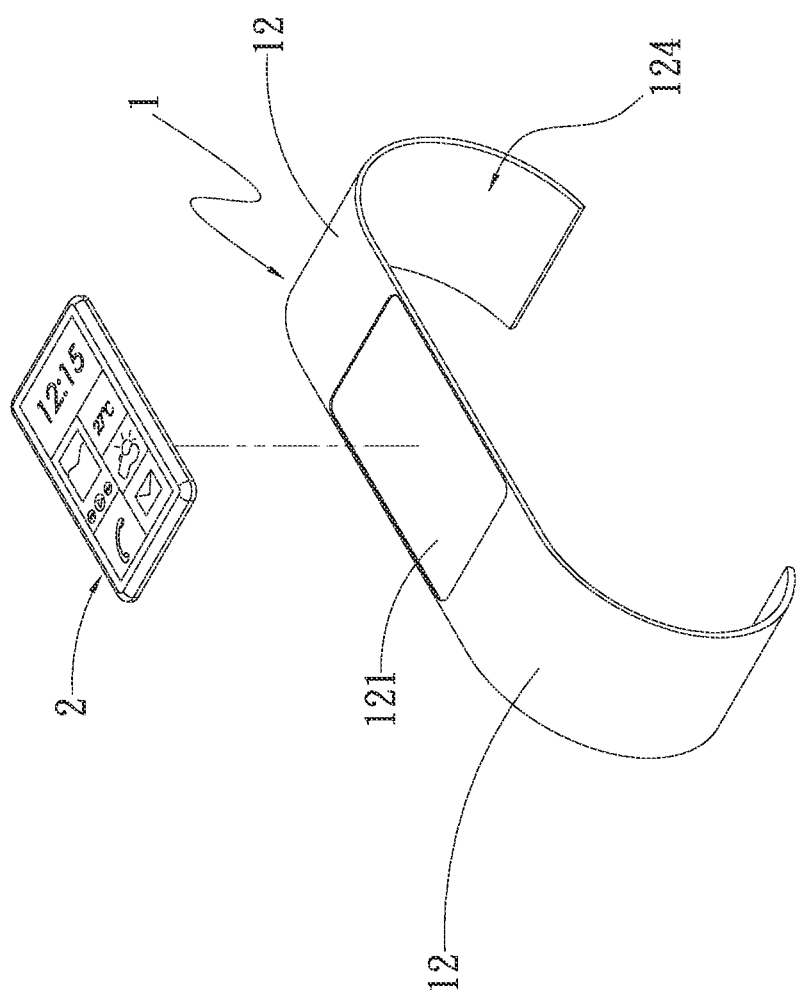
FIG. 11 is a perspective exploded view of a sixth embodiment of the present invention.
Figure 12:
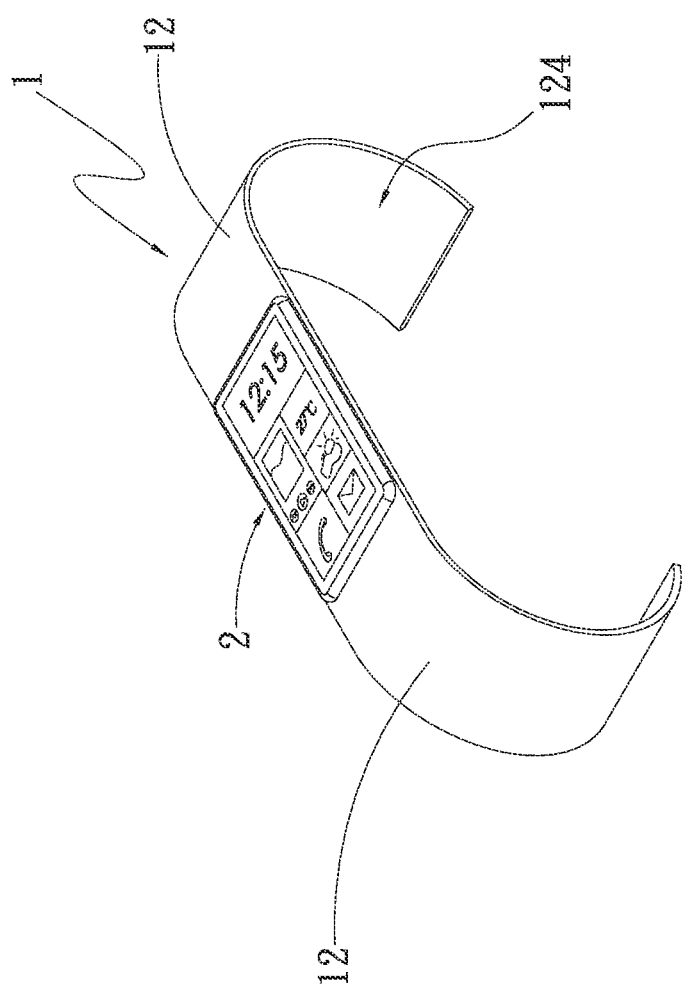
FIG. 12 is a perspective assembled view of the sixth embodiment of the present invention.
Figure 13:
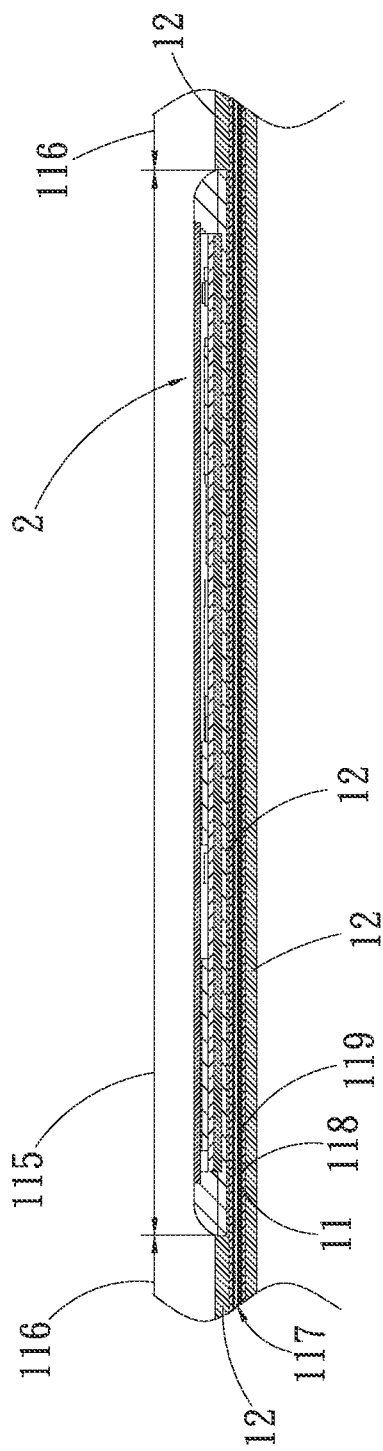
FIG. 13 is a sectional assembled view of the sixth embodiment of the present invention.

Please now refer to FIGS. 11, 12 and 13. FIG. 11 is a perspective exploded view of a sixth embodiment of the present invention. FIG. 12 is a perspective assembled view of the sixth embodiment of the present invention. FIG. 13 is a sectional assembled view of the sixth embodiment of the present invention. Also referring to FIG. 4, the sixth embodiment is substantially identical to the fourth and fifth embodiments in structure, connection relationship and effect and thus will not be repeatedly described. The sixth embodiment is different from the fourth and fifth embodiments in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. One face of the heat absorption section 115 of the heat conduction section 11 (the flexible heat pipe as shown in FIGS. 4 and 13 or the heat pipe as shown in FIGS. 12 and 13) corresponds to the intelligent mobile device 2 received in the recess 121. When the intelligent mobile device 2 generates heat, the face of the heat absorption section 115 of the heat conduction section 11 absorbs the heat and quickly conducts the heat to the heat dissipation section 116 on at least one side to dissipate the heat. Accordingly, the heat accumulation problem of the intelligent mobile device 2 is solved.

Figure 14:
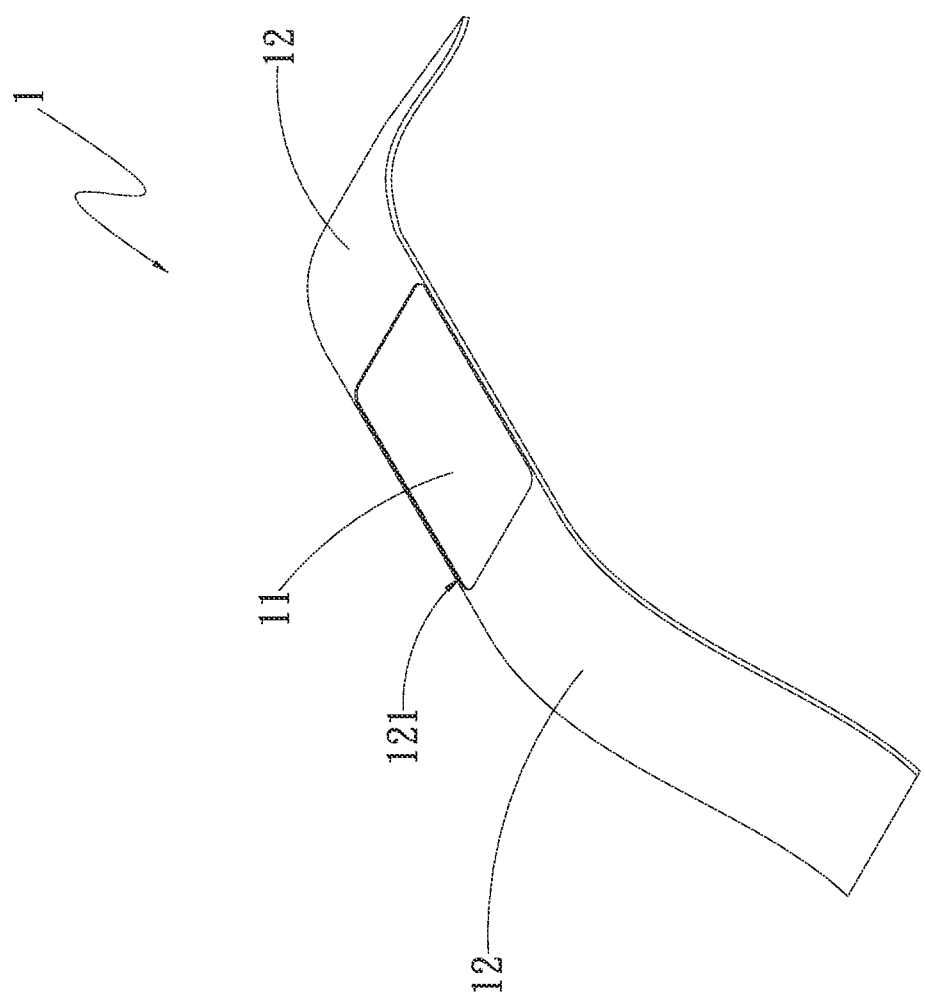
FIG. 14 is a perspective view of a seventh embodiment of the present invention.
Figure 15:
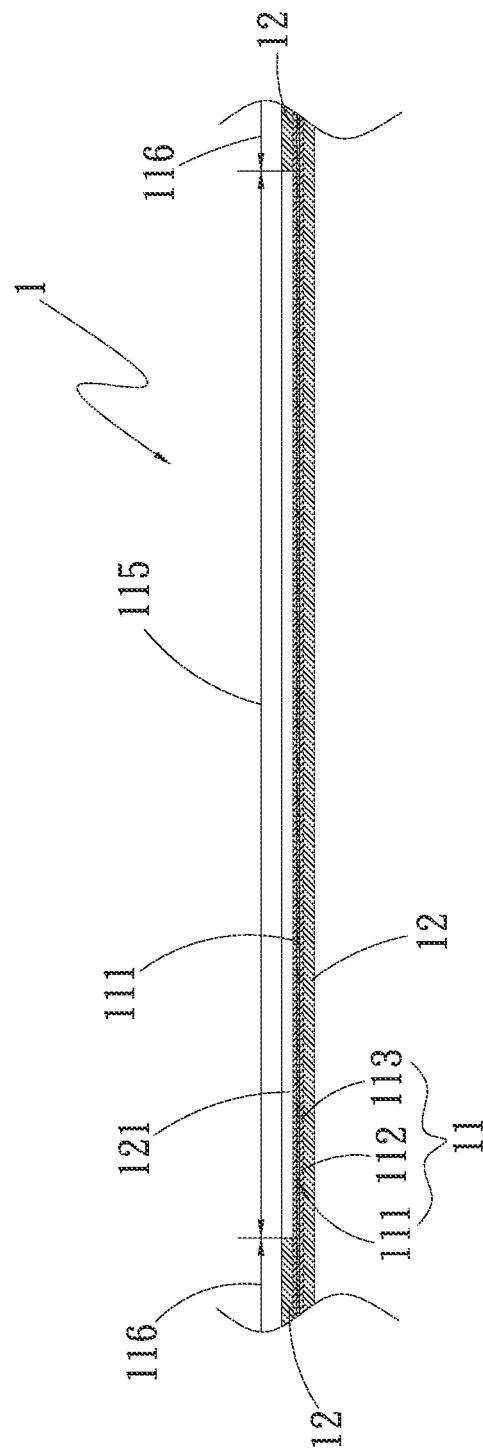
FIG. 15 is a sectional view of the seventh embodiment of the present invention.

Please now refer to FIGS. 14 and 15. FIG. 14 is a perspective view of a seventh embodiment of the present invention. FIG. 15 is a sectional view of the seventh embodiment of the present invention. The seventh embodiment is substantially identical to the first embodiments in structure, connection relationship and effect and thus will not be repeatedly described. The seventh embodiment is different from the first embodiment in that the recess 121 is formed through the center of one face of the protection section 12. The recess 121 corresponds to the heat absorption section 115, whereby one face of the heat absorption section 115 is exposed to the interior of the recess 121. In other words, the first heat conduction layer 111 of the heat conduction section 11 is exposed to the interior of the recess 121.

The wearable strap body 1 of the present invention is mainly applied to and connected with the intelligent mobile device 2 (such as an intelligent watch). The heat dissipation structure of wearable watchstrap of the present invention enables a user to wear the intelligent mobile device and provides heat dissipation effect for the intelligent mobile device 2. Therefore, the heat will not accumulate in the intelligent mobile device 2 and the heat dissipation performance of the intelligent mobile device is enhanced.

Figure 16:
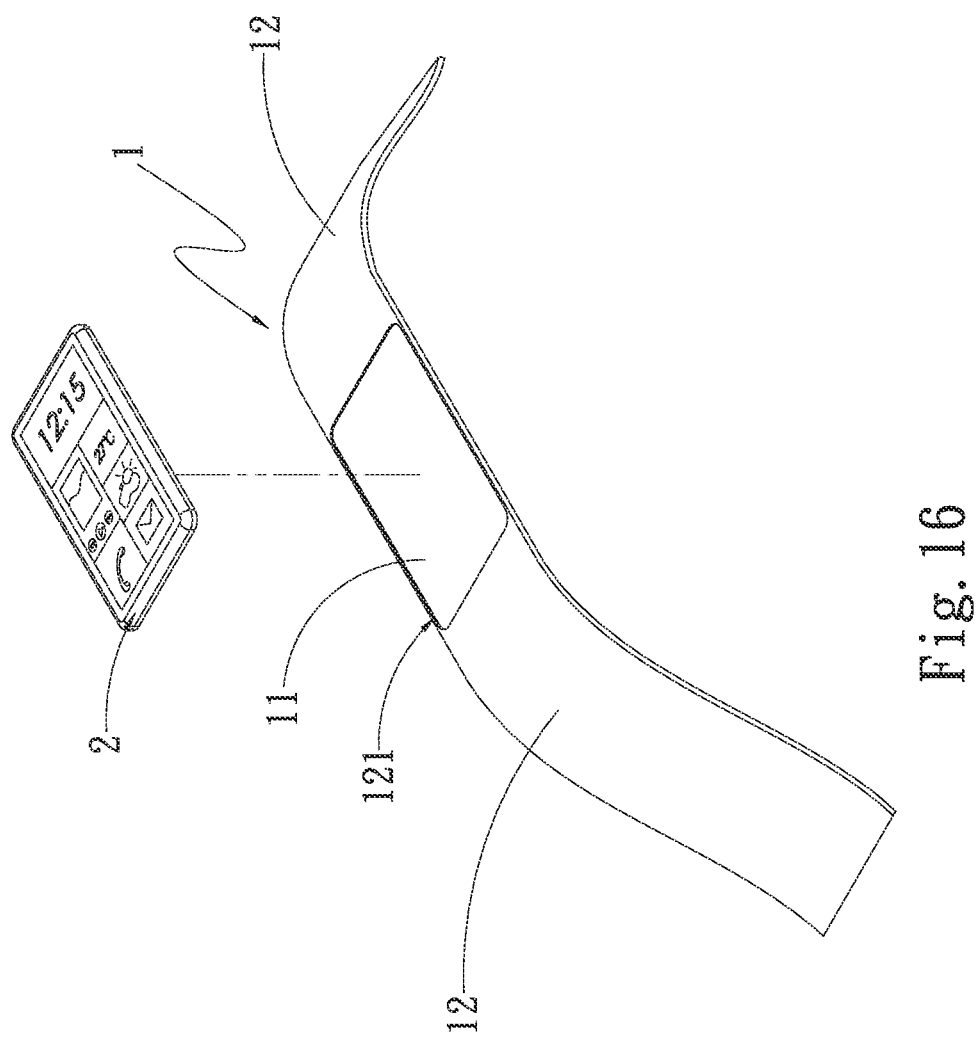
FIG. 16 is a perspective exploded view of an eighth embodiment of the present invention.
Figure 17:
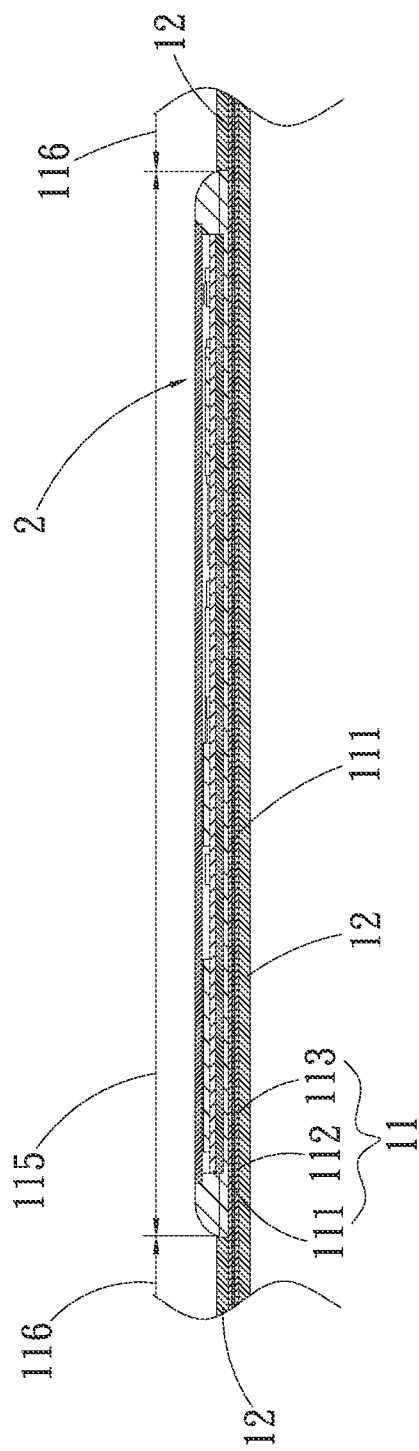
FIG. 17 is a sectional assembled view of the eighth embodiment of the present invention.

Please now refer to FIGS. 16 and 17. FIG. 16 is a perspective exploded view of an eighth embodiment of the present invention. FIG. 17 is a sectional assembled view of the eighth embodiment of the present invention. The eighth embodiment is substantially identical to the seventh embodiment in structure, connection relationship and effect and thus will not be repeatedly described. The eighth embodiment is different from the seventh embodiment in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. The bottom of the intelligent mobile device 2 is attached to one face of the heat absorption section 115 exposed to the interior of the recess 121. In other words, the first heat conduction layer 111 exposed to the interior of the recess 121 is correspondingly attached to the bottom of the intelligent mobile device 2. When the intelligent mobile device 2 generates heat, the first heat conduction layer 111 absorbs the heat and quickly transfers the heat to the second and third heat conduction layers 112, 113. At the same time, the heat is conducted to the heat dissipation section 116 and dissipated outward. Accordingly, the heat accumulation problem of the intelligent mobile device 2 is solved. In other words, the heat generated by the intelligent mobile device 2 can be effectively dissipated.

Figure 18:
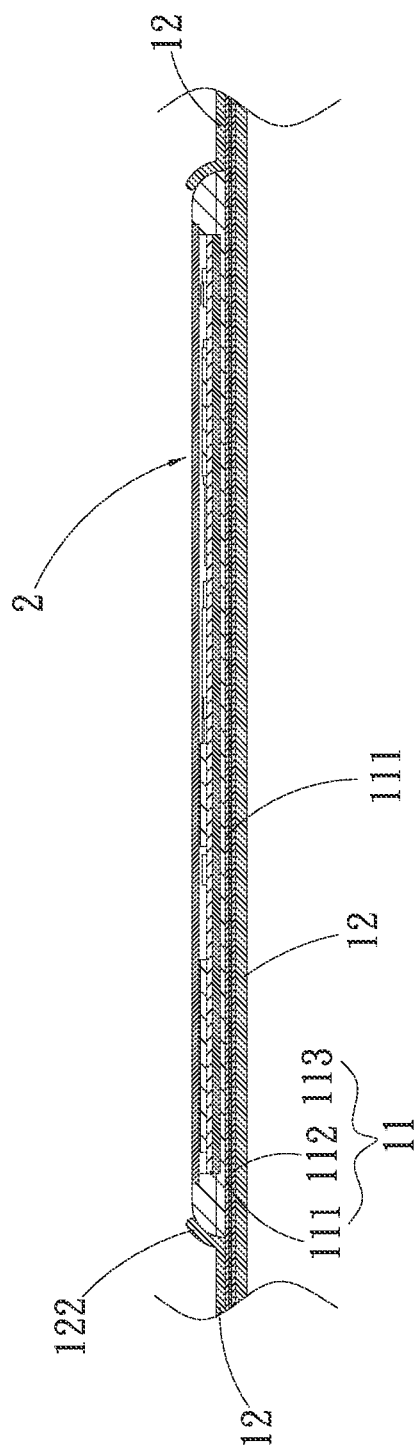
FIG. 18 is a sectional assembled view of a ninth embodiment of the present invention.

Please now refer to FIG. 18, which is a sectional assembled view of a ninth embodiment of the present invention. Also referring to FIG. 7, the ninth embodiment is substantially identical to the eighth embodiment in structure, connection relationship and effect and thus will not be repeatedly described. The ninth embodiment is different from the eighth embodiment in that the protection section 12 has multiple engagement protrusion bodies 122. The engagement protrusion bodies 122 upward protrude from one face of the protection section 12 in adjacency to the recess 121. The intelligent mobile device 2 is received in the recess 121 and the periphery of the intelligent mobile device 2 is correspondingly engaged with free ends of the engagement protrusion bodies 122. The engagement protrusion bodies 122 can be elastic.

Figure 19:
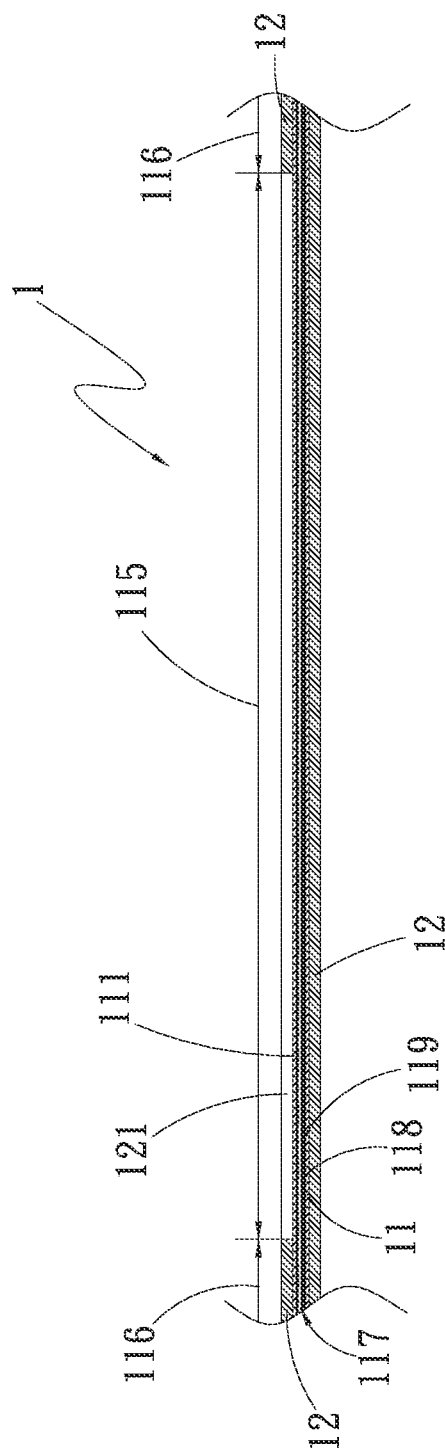
FIG. 19 is a sectional assembled view of a tenth embodiment of the present invention.

Please now refer to FIG. 19, which is a sectional view of a tenth embodiment of the present invention. Also referring to FIG. 14, the tenth embodiment is substantially identical to the seventh embodiment in structure, connection relationship and effect and thus will not be repeatedly described. The tenth embodiment is different from the seventh embodiment in that the heat conduction section 11 is a flexible heat pipe. That is, the heat conduction section 11 is a flexible heat pipe made of flexible metal material (such as copper material), flexible thin heat pipe made of flexible metal material (such as copper material or aluminum material) or flexible thin heat pipe made of flexible nonmetal material (such as plastic, rubber or polyethylene terephthalate, PET). The protection section 12 is made of flexible plastic material or hard plastic material. In this embodiment, the protection section 205 is made of flexible plastic material for illustration.

In this embodiment, the heat conduction section 11 is a flexible heat pipe for illustration. The heat conduction section 11 has a chamber 117 and a capillary structure 118. A working fluid 119 is filled in the chamber 117. The working fluid 119 is selected from a group consisting of pure water, inorganic compound, alcohol group, ketone group, liquid metal, coolant and organic compound. The capillary structure 118 is formed on inner wall face of the chamber 117. One face of the heat absorption section 115 of the heat conduction section 11 (the flexible heat pipe) is exposed to the interior of the recess 121.

Figure 20:
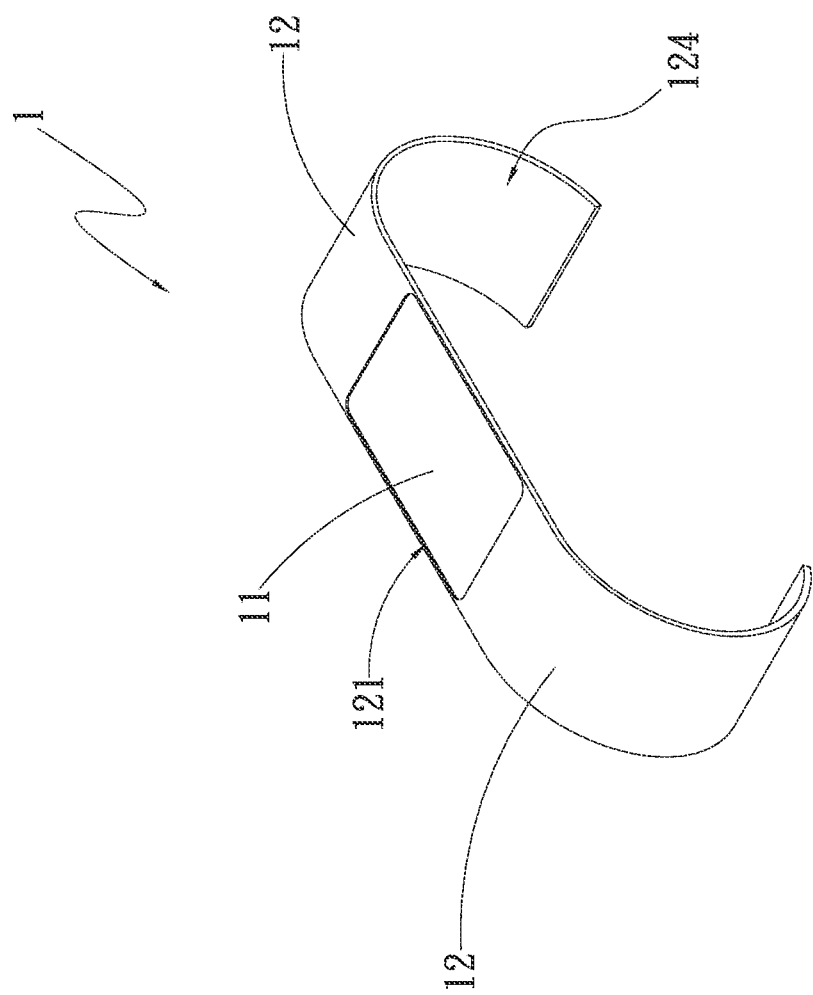
FIG. 20 is a perspective view of an eleventh embodiment of the present invention.

Please now refer to FIG. 20, which is a perspective view of an eleventh embodiment of the present invention. Also referring to FIG. 19, the eleventh embodiment is substantially identical to the tenth embodiment in structure, connection relationship and effect and thus will not be repeatedly described. The tenth embodiment is different from the seventh embodiment in that the heat conduction section 11 is a heat pipe made of hard metal material and the protection section 12 is made of hard plastic material. Therefore, the heat dissipation sections 116 on two sides of the heat absorption section 115 are respectively inward bent and secured to form a fitting opening 124. A user can directly wear the wearable strap body 1 through the fitting opening 124.

Figure 21:
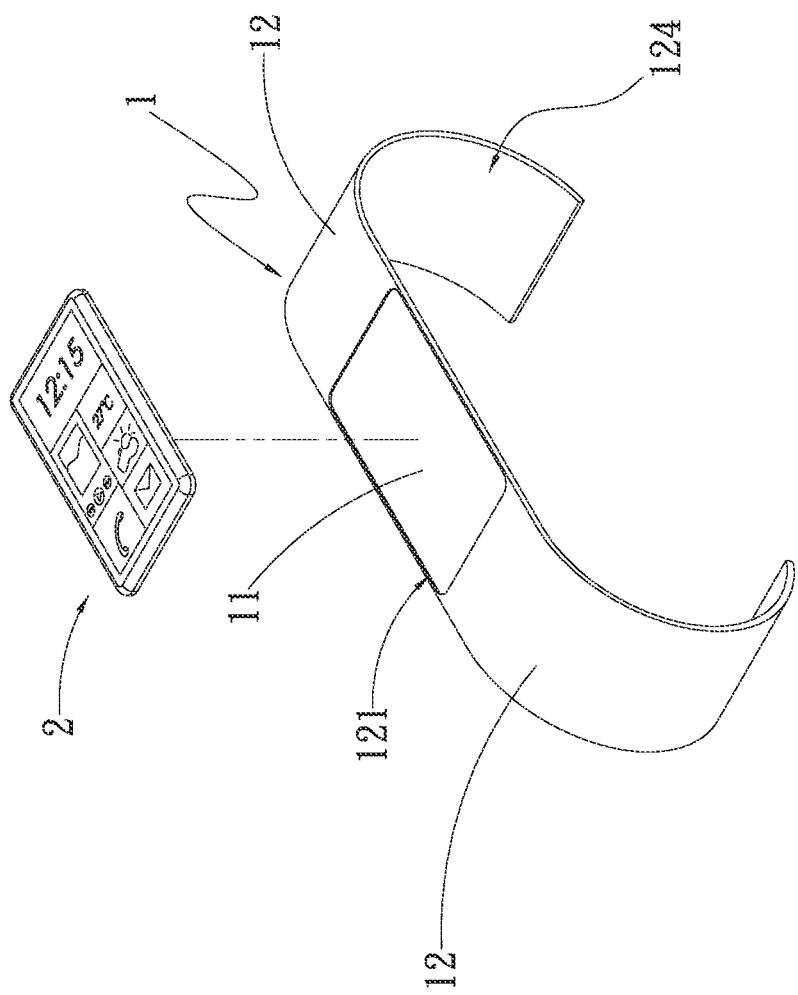
FIG. 21 is a perspective exploded view of a twelfth embodiment of the present invention.
Figure 22:
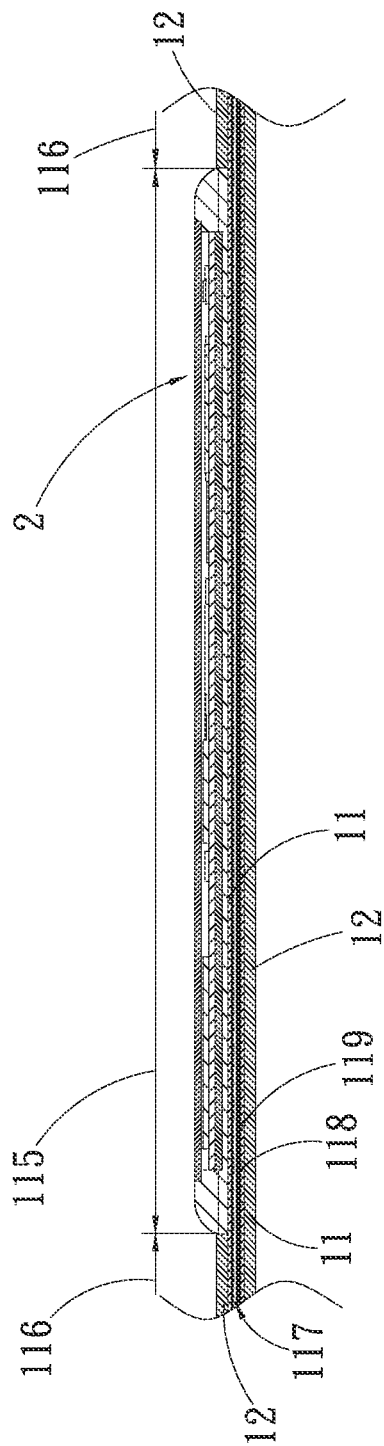
FIG. 22 is a sectional assembled view of the twelfth embodiment of the present invention.

Please now refer to FIGS. 21 and 22. FIG. 21 is a perspective exploded view of a twelfth embodiment of the present invention. FIG. 22 is a sectional assembled view of the twelfth embodiment of the present invention. Also referring to FIG. 12, the twelfth embodiment is substantially identical to the tenth and eleventh embodiments in structure, connection relationship and effect and thus will not be repeatedly described. The twelfth embodiment is different from the tenth and eleventh embodiments in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. One face of the heat absorption section 115 of the heat conduction section 11 (the flexible heat pipe as shown in FIGS. 4 and 22 or the heat pipe as shown in FIGS. 12 and 21) is exposed to the interior of the recess 121 and correspondingly attached to the bottom face of the intelligent mobile device 2. When the intelligent mobile device 2 (such as an intelligent watch) generates heat, the face of the heat absorption section 115 of the heat conduction section 11 directly absorbs the heat and quickly conducts the heat to the heat dissipation section 116 on two sides to dissipate the heat. Accordingly, the heat accumulation problem of the intelligent mobile device 2 is solved.

Figure 23:
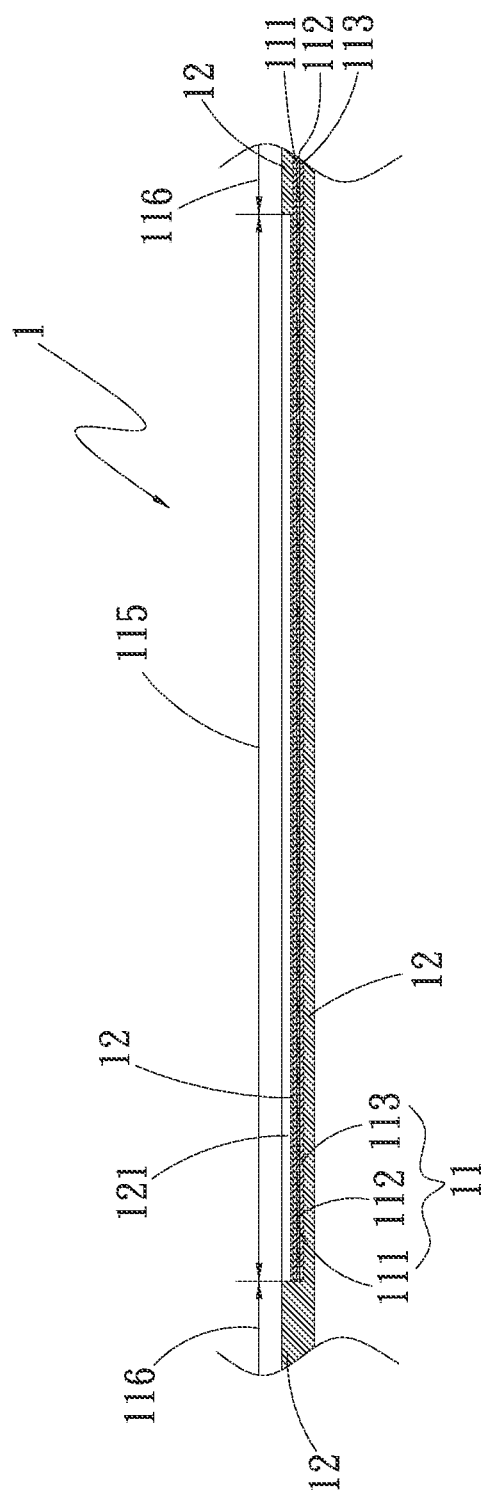
FIG. 23 is a sectional view of a thirteenth embodiment of the present invention.

Please now refer to FIG. 23, which is a sectional view of a thirteenth embodiment of the present invention. Also referring to FIG. 1, the thirteenth embodiment is substantially identical to the first embodiment in structure, connection relationship and effect and thus will not be repeatedly described. The thirteenth embodiment is different from the first embodiment in that the heat dissipation section 116 alternatively outward extends from one side of the heat absorption section 115. That is, the heat absorption section 115 and the heat dissipation section 116 are enclosed in a part of the protection section 12. The heat absorption section 115 enclosed in the protection section 12 corresponds to the recess 121. The other part of the protection section 12 does not enclose the heat conduction section 11. As shown in FIG. 23, the protection section 12 of the front section of the wearable strap body 1 does not enclose the heat conduction section 11. The protection section 12 of the middle and rear sections of the wearable strap body 1 encloses the heat conduction section 11.

Figure 24:
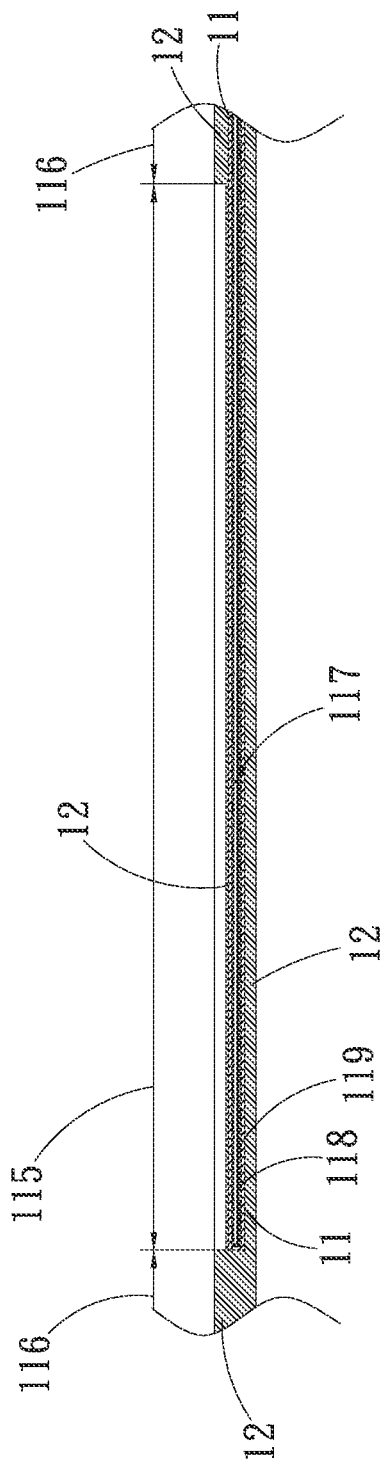
FIG. 24 is a sectional view of the thirteenth embodiment of the present invention in another aspect.

In practice, the heat conduction section 11 can be a flexible heat pipe as the fourth embodiment or a heat pipe made of hard metal material as the fifth embodiment. As shown in FIGS. 1 and 24, the protection section 12 of the front section of the wearable strap body 1 does not enclose the heat conduction section 11. The protection section 12 of the middle and rear sections of the wearable strap body 1 encloses the heat conduction section 11, which is a flexible heat pipe. Alternatively, as shown in FIGS. 10 and 24, the protection section 12 of the front section of the wearable strap body 1 does not enclose the heat conduction section 11. The protection section 12 of the middle and rear sections of the wearable strap body 1 encloses the heat conduction section 11, which is a heat pipe made of hard metal material.

Figure 25A:
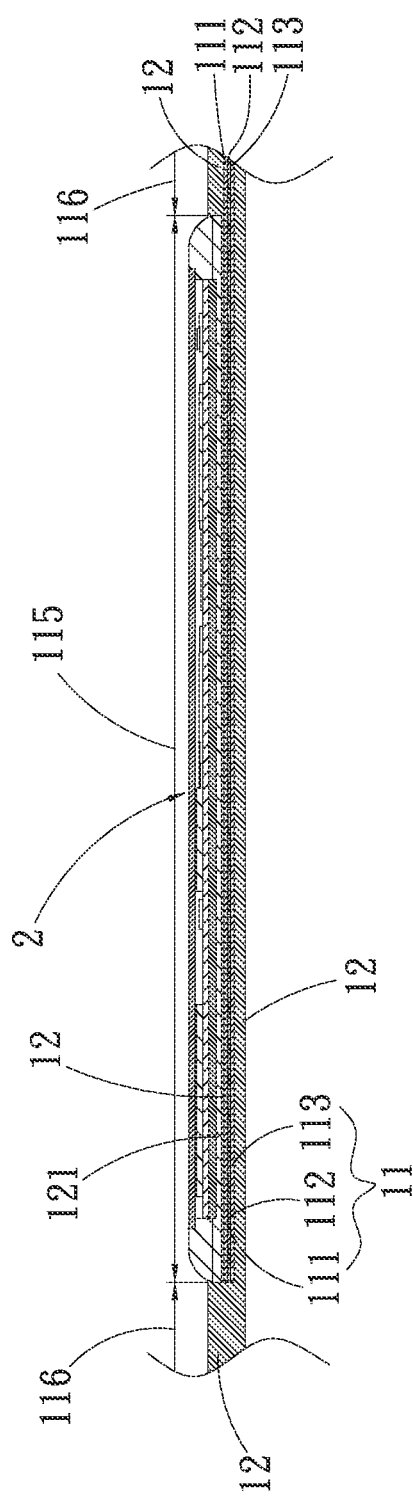
FIG. 25A is a sectional assembled view of a fourteenth embodiment of the present invention.

Please now refer to FIG. 25A, which is a sectional assembled view of a fourteenth embodiment of the present invention. Also referring to FIG. 4, the fourteenth embodiment is substantially identical to the thirteenth embodiment in structure, connection relationship and effect and thus will not be repeatedly described. The fourteenth embodiment is different from the thirteenth embodiment in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. The first heat conduction layer 111 of the heat conduction section 11 corresponds to the intelligent mobile device 2 received in the recess 121. When the intelligent mobile device 2 generates heat, the first heat conduction layer 111 absorbs the heat and quickly conducts the heat to the second and third heat conduction layers 112, 113. At the same time, the heat is conducted to the heat dissipation section 116 on one side and dissipated outward. Accordingly, the heat accumulation problem of the intelligent mobile device 2 is solved. In other words, the heat generated by the intelligent mobile device 2 can be effectively dissipated.

Figure 25B:
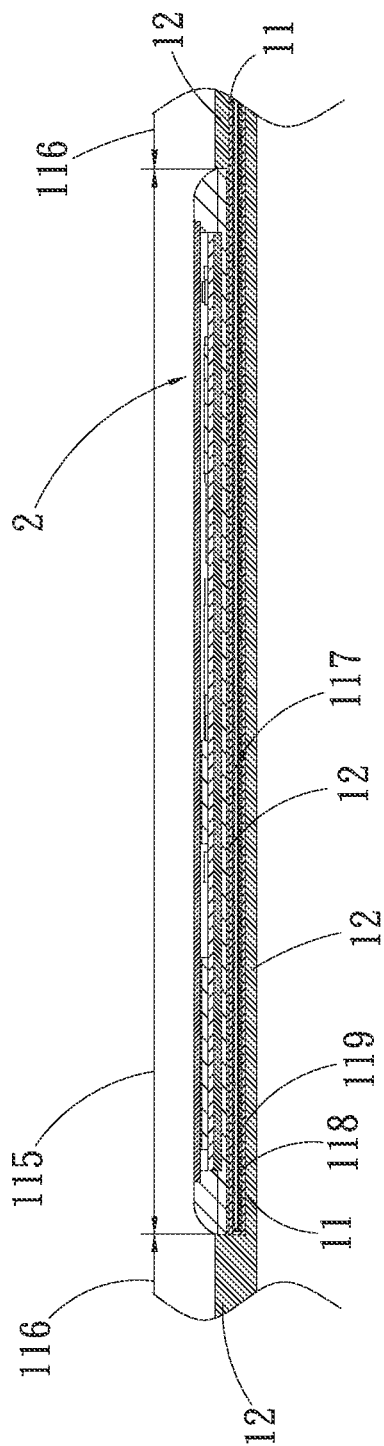
FIG. 25B is a sectional assembled view of the fourteenth embodiment of the present invention in another aspect.

In practice, the heat conduction section 11 can be alternatively a flexible heat pipe (as shown in FIGS. 4 and 25B) or a heat pipe made of hard metal material (as shown in FIGS. 12 and 25B).

Figure 26:
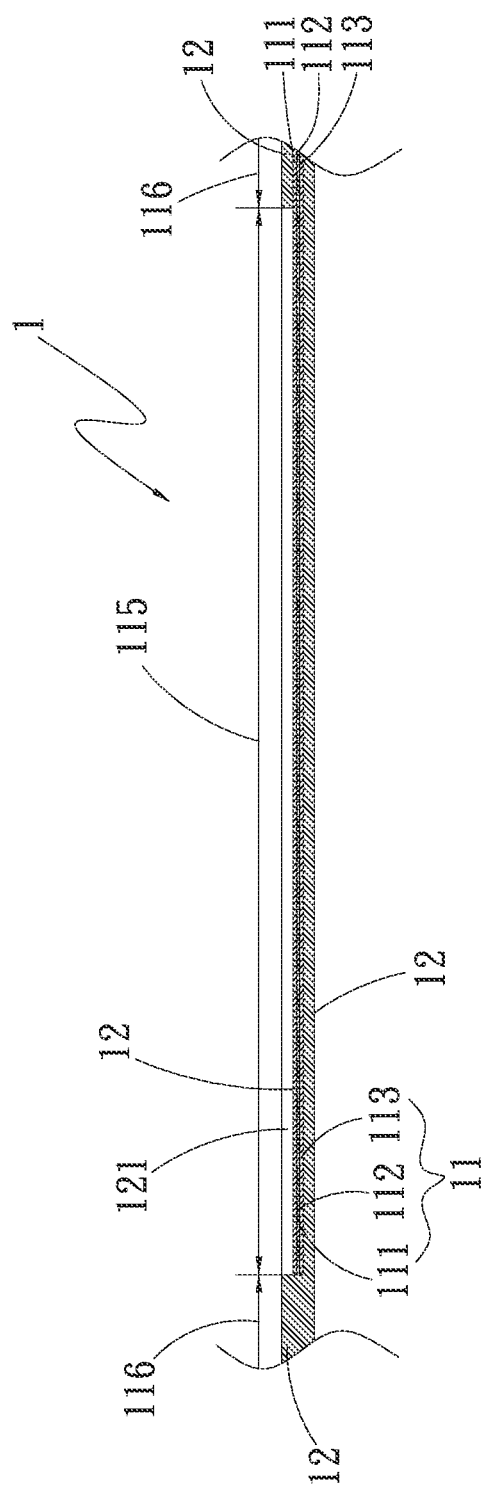
FIG. 26 is a sectional view of a fifteenth embodiment of the present invention.

Please now refer to FIG. 26, which is a sectional view of a fifteenth embodiment of the present invention. Also referring to FIG. 14, the fifteenth embodiment is substantially identical to the first embodiment in structure, connection relationship and effect and thus will not be repeatedly described. The fifteenth embodiment is different from the first embodiment in that the heat dissipation section 116 alternatively outward extends from one side of the heat absorption section 115. In addition, the recess 121 is formed through the center of one face of the protection section 12. That is, the heat absorption section 115 and the heat dissipation section 116 of the heat conduction section 11 are enclosed in a part of the protection section 12. One face of the heat absorption section 115 is exposed to the interior of the recess 121 and is not enclosed by the protection section 12. The other part of the protection section 12 does not enclose the heat conduction section 11. As shown in FIG. 26, the protection section 12 of the front section of the wearable strap body 1 does not enclose the heat conduction section 11. The protection section 12 of the middle and rear sections of the wearable strap body 1 encloses the heat absorption section 115 and the heat dissipation section 116 of the heat conduction section 11. One face of the heat absorption section 115 of the heat conduction section 11 of the middle section of the wearable strap body 1 is exposed to the interior of the recess 121 and is not enclosed by the protection section 12.

Figure 27:
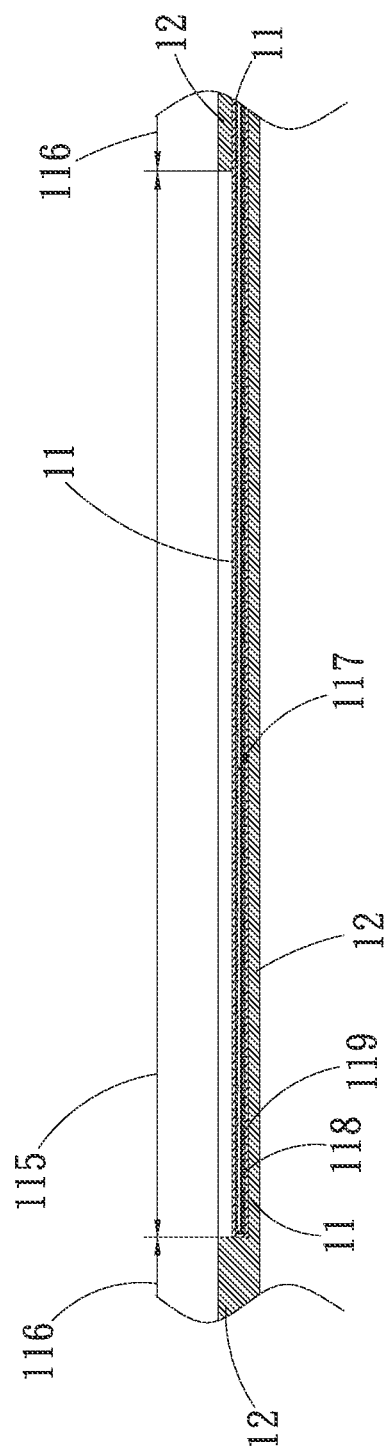
FIG. 27 is a sectional view of the fifteenth embodiment of the present invention in another aspect.

In practice, the heat conduction section 11 can be alternatively a flexible heat pipe as the tenth embodiment or a heat pipe made of hard metal material as the eleventh embodiment. As shown in FIGS. 14 and 27, the protection section 12 of the front section of the wearable strap body 1 does not enclose the heat conduction section 11. The protection section 12 of the middle and rear sections of the wearable strap body 1 encloses the heat conduction section 11, which is a flexible heat pipe. One face of the heat absorption section 115 of the heat conduction section 11 (the flexible heat pipe) of the middle section of the wearable strap body 1 is exposed to the interior of the recess 121 and is not enclosed by the protection section 12. Alternatively, as shown in FIGS. 20 and 27, the protection section 12 of the front section of the wearable strap body 1 does not enclose the heat conduction section 11. The protection section 12 of the middle and rear sections of the wearable strap body 1 encloses the heat conduction section 11, which is a flexible heat pipe. One face of the heat absorption section 115 of the heat conduction section 11 (the heat pipe) of the middle section of the wearable strap body 1 is exposed to the interior of the recess 121 and is not enclosed by the protection section 12.

Figure 28:
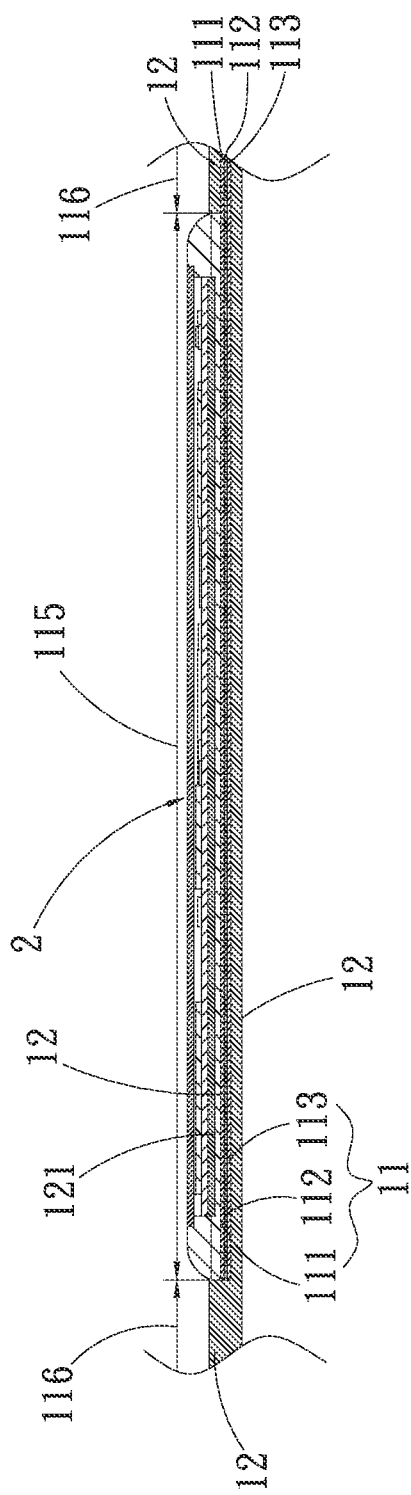
FIG. 28 is a sectional assembled view of a sixteenth embodiment of the present invention.

Please now refer to FIG. 28, which is a sectional assembled view of a sixteenth embodiment of the present invention. Also referring to FIG. 16, the sixteenth embodiment is substantially identical to the fifteenth embodiment in structure, connection relationship and effect and thus will not be repeatedly described. The sixteenth embodiment is different from the fifteenth embodiment in that the heat dissipation structure of wearable watchstrap of the present invention is connected with an intelligent mobile device 2. In this embodiment, the intelligent mobile device 2 is, but not limited to, an intelligent watch for illustration purposes only.

The intelligent mobile device 2 is received in the recess 121 and correspondingly assembled with the wearable strap body 1. The first heat conduction layer 111 of the heat conduction section 11 corresponds to the intelligent mobile device 2 received in the recess 121. The first heat conduction layer 111 is exposed to the interior of the recess 121 and correspondingly attached to the bottom of the intelligent mobile device 2. When the intelligent mobile device 2 generates heat, the first heat conduction layer 111 absorbs the heat and quickly transfers the heat to the second and third heat conduction layers 112, 113. At the same time, the heat is conducted to the heat dissipation section 116 on one side and dissipated outward. Accordingly, the heat accumulation problem of the intelligent mobile device 2 is solved. In other words, the heat generated by the intelligent mobile device 2 can be effectively dissipated.

Figure 29:
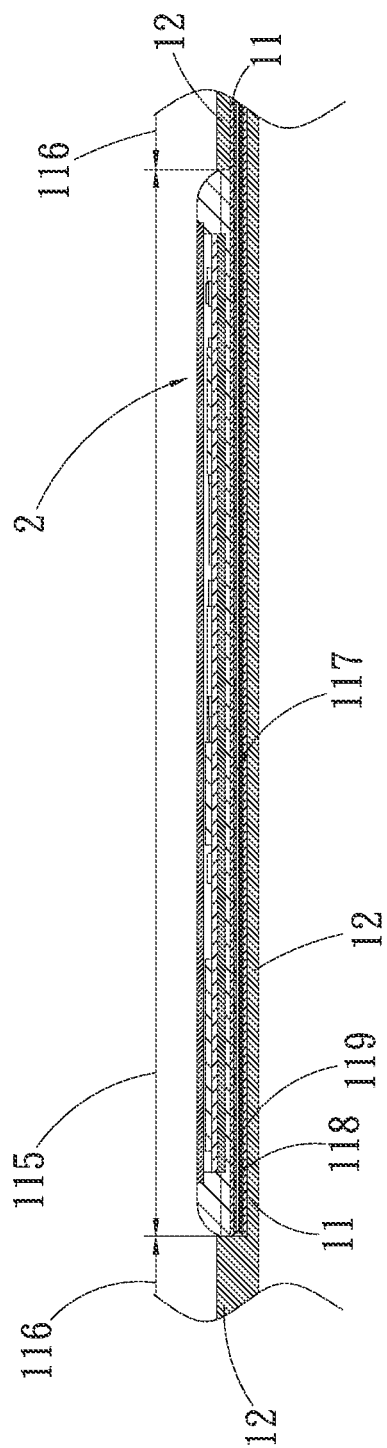
FIG. 29 is a sectional assembled view of the sixteenth embodiment of the present invention in another aspect.

In practice, the heat conduction section 11 can be alternatively a flexible heat pipe (as shown in FIGS. 4 and 29) or a heat pipe made of hard metal material (as shown in FIGS. 12 and 29).

The present invention has been described with the above embodiments thereof and it is understood that many changes and modifications in the above embodiments can be carried out without departing from the scope and the spirit of the invention that is intended to be limited only by the appended claims.

What is claimed is:

1. A heat dissipation structure of wearable watchstrap comprising a wearable strap body, the wearable strap body including a heat conduction section and a protection section, the protection section enclosing the heat conduction section, the heat conduction section having a heat absorption section and a heat dissipation section, the heat dissipation section outward extending from the heat absorption section
   wherein the protection section is formed with a recess, the recess being formed at a center of one face of the protection section corresponding to one face of the heat absorption section where is enclosed by the protection section, an intelligent mobile device being correspondingly receivable in the recess to connect with the wearable strap body;
   wherein the heat conduction section has a first heat conduction layer, a second heat conduction layer and a third heat conduction layer, the whole second heat conduction layer being sandwiched between the first and third heat conduction layers, the first heat conduction layer corresponding to the intelligent mobile device received in the recess; and
   wherein the first and third heat conduction layers are made of metal foils and the second heat conduction layer is made of graphite material, the protection section being made of flexible plastic material.

2. A heat dissipation structure of wearable watchstrap comprising: a wearable strap body, the wearable strap body including a heat conduction section and a protection section, the protection section enclosing the heat conduction section, the heat conduction section having a heat absorption section and a heat dissipation section, the heat dissipation section outward extending from the heat absorption section, and wherein the heat conduction section has a first heat conduction layer, a second heat conduction layer, and a third heat conduction layer wherein the whole second heat conduction layer being sandwiched between the first and third conduction layer, the first heat conduction layer being exposed to an interior of the recess and correspondingly attached to a bottom of the intelligent mobile device; wherein the protection section is formed with a recess, the recess being formed at a center of one face of the protection section corresponding to one face of the heat absorption section where is enclosed by the protection section, an intelligent mobile device being correspondingly receivable in the recess to connect with the wearable strap body; and wherein the heat conduction section is a heat pipe made of flexible metal material, the heat conduction section having a chamber and a capillary structure, a working fluid being filled in the chamber, the capillary structure being formed on inner wall face of the chamber, one face of the heat absorption section corresponding to the intelligent mobile device received in the recess, the protection section being made of flexible plastic material or hard plastic material.

3. A heat dissipation structure of wearable watchstrap comprising: a wearable strap body, the wearable strap body including a heat conduction section and a protection section, the protection section enclosing the heat conduction section, the heat conduction section having a heat absorption section and a heat dissipation section, the heat dissipation section outward extending from the heat absorption section, and wherein the heat conduction section has a first heat conduction layer, a second heat conduction layer, and a third heat conduction layer wherein the whole second heat conduction layer being sandwiched between the first and third conduction layer, the first heat conduction layer being exposed to an interior of the recess and correspondingly attached to a bottom of the intelligent mobile device; wherein the protection section is formed with a recess, the recess being formed at a center of one face of the protection section corresponding to one face of the heat absorption section where is enclosed by the protection section, an intelligent mobile device being correspondingly receivable in the recess to connect with the wearable strap body; and wherein the heat conduction section is a heat pipe made of hard metal material, the heat conduction section having a chamber and a capillary structure, a working fluid being filled in the chamber, the capillary structure being formed on inner wall face of the chamber, one face of the heat absorption section corresponding to the intelligent mobile device received in the recess, the protection section being made of hard plastic material.

4. A heat dissipation structure of wearable watchstrap comprising a wearable strap body, the wearable strap body including a heat conduction section and a protection section, the protection section enclosing the heat conduction section, the heat conduction section having a heat absorption section and a heat dissipation section, the heat dissipation section outward extending from the heat absorption section, wherein the protection section is formed with a recess, the recess being formed through the center of one face of the protection section corresponding to the heat absorption section, an intelligent mobile device being correspondingly receivable in the recess to connect with the wearable strap body;

wherein the heat conduction section has a first heat conduction layer, a second heat conduction layer and a third heat conduction layer, the whole second heat conduction layer being sandwiched between the first and third heat conduction layers, the first heat conduction layer being exposed to an interior of the recess and correspondingly attached to a bottom of the intelligent mobile device; and wherein the first and third heat conduction layers are made of metal foils and the second heat conduction layer is made of graphite material, the protection section being made of flexible plastic material.

5. The heat dissipation structure of wearable watchstrap as claimed in claim 4, wherein the heat conduction section has a first heat conduction layer, a second heat conduction layer and a third heat conduction layer, the second heat conduction layer being sandwiched between the first and third heat conduction layers, the first heat conduction layer being exposed to the interior of the recess and correspondingly attached to the bottom of the intelligent mobile device.

6. The heat dissipation structure of wearable watchstrap as claimed in claim 4, wherein the heat conduction section is a heat pipe made of flexible metal material, the heat conduction section having a chamber and a capillary structure, a working fluid being filled in the chamber, the capillary structure being formed on inner wall face of the chamber, one face of the heat absorption section being exposed to the interior of the recess and correspondingly attached to the bottom of the intelligent mobile device, the protection section being made of flexible plastic material or hard plastic material.

7. The heat dissipation structure of wearable watchstrap as claimed in claim 4, wherein the heat conduction section is a heat pipe made of hard metal material, the heat conduction section having a chamber and a capillary structure, a working fluid being filled in the chamber, the capillary structure being formed on inner wall face of the chamber, one face of the heat absorption section being exposed to the interior of the recess and correspondingly attached to the bottom of the intelligent mobile device, the protection section being made of hard plastic material.

8. The heat dissipation structure of wearable watchstrap as claimed in claim 1, wherein the protection section has multiple engagement protrusion bodies, the engagement protrusion bodies upward protruding from one face of the protection section in adjacency to the recess, an periphery of the intelligent mobile device being correspondingly engaged with free ends of the engagement protrusion bodies.

9. The heat dissipation structure of wearable watchstrap as claimed in claim 4, wherein the protection section has multiple engagement protrusion bodies, the engagement protrusion bodies upward protruding from one face of the protection section in adjacency to the recess, a periphery of the intelligent mobile device being correspondingly engaged with free ends of the engagement protrusion bodies.

10. The heat dissipation structure of wearable watchstrap as claimed in claim 1, wherein the protection section has an engagement protrusion body in the form of a peripheral wall, the engagement protrusion body upward protruding from one face of the protection section in adjacency to the recess to define a space, a periphery of the intelligent mobile device being correspondingly enclosed in the space.

11. The heat dissipation structure of wearable watchstrap as claimed in claim 4, wherein the protection section has an engagement protrusion body in the form of a peripheral wall, the engagement protrusion body upward protruding from one face of the protection section in adjacency to the recess to define a space, a periphery of the intelligent mobile device being correspondingly enclosed in the space.

12. The heat dissipation structure of wearable watchstrap as claimed in claim 1, wherein the heat dissipation section outward extends from one side of the heat absorption section, the heat absorption section and the heat dissipation section of the heat conduction section being enclosed in a part of the protection section, the heat conduction section being not enclosed in the other part of the protection section.

13. The heat dissipation structure of wearable watchstrap as claimed in claim 4, wherein the heat dissipation section outward extends from one side of the heat absorption section, the heat absorption section and the heat dissipation section of the heat conduction section being enclosed in a part of the protection section, one face of the heat absorption section being exposed to the interior of the recess and not enclosed by the protection section, the heat conduction section being not enclosed in the other part of the protection section.

* * * * *